United States Patent
Kobayashi et al.

(10) Patent No.: US 6,368,668 B1
(45) Date of Patent: Apr. 9, 2002

(54) METHOD AND APPARATUS FOR PRODUCING A PHOTOCATALYTIC MATERIAL

(75) Inventors: Hideki Kobayashi; Yoshimitsu Saeki; Shinji Tanaka; Yasushi Nakashima; Yoshitaka Mayumi, all of Fukuoka-Ken (JP)

(73) Assignee: Toto Ltd., Fukuoka-ken (JP)

( * ) Notice: Subject to any disclaimer, the term of this patent is extended or adjusted under 35 U.S.C. 154(b) by 0 days.

(21) Appl. No.: 09/518,909

(22) Filed: Mar. 3, 2000

Related U.S. Application Data

(63) Continuation of application No. PCT/JP99/04126, filed on Jul. 30, 1999.

(30) Foreign Application Priority Data

| Jul. 30, 1998 | (JP) | 10-230120 |
| Oct. 19, 1998 | (JP) | 10-316847 |
| Jan. 22, 1999 | (JP) | 11-014868 |
| Jun. 10, 1999 | (JP) | 11-164364 |

(51) Int. Cl.[7] .................. B01J 21/06; C04B 41/85
(52) U.S. Cl. .................. 427/376.2; 427/376.3; 427/380; 427/419.3; 427/419.4; 432/128; 432/207
(58) Field of Search .................. 428/701, 702; 427/376.2, 376.3, 380, 419.3, 419.4; 432/128, 207

(56) References Cited

U.S. PATENT DOCUMENTS 5,658,841 A 8/1997 Tanaka et al.
5,853,866 A * 12/1998 Watanabe et al. ........ 428/312.8

FOREIGN PATENT DOCUMENTS

| JP | 3-72297 | | 7/1991 |
| JP | 7-232080 | * | 9/1995 |
| JP | 08131841 | | 5/1996 |
| JP | 08318166 | | 12/1996 |
| JP | 09040872 | | 2/1997 |
| JP | 09056792 | | 3/1997 |
| JP | 9-248468 | * | 9/1997 |
| JP | 10001879 | | 1/1998 |
| JP | 10180118 | | 7/1998 |
| JP | 10-237416 | * | 9/1998 |
| JP | 11-169726 | * | 6/1999 |
| WO | WO 95/15816 | * | 6/1995 |

* cited by examiner

Primary Examiner—John J. Zimmerman
(74) Attorney, Agent, or Firm—Jones, Day, Reavis & Pogue

(57) ABSTRACT

Disclosed is a method and an apparatus are provided which can efficiently produce a functional material having a satisfactory level of photocatalytic activity. A photocatalyst coating composition comprising a photocatalytic metal oxide and/or a precursor of the photocatalytic metal oxide is coated on the surface of a substrate. The surface of the coated substrate is rapidly heated to fix the photocatalytic metal oxide onto the surface of the substrate. This rapid heating can realize the production of a functional material having a satisfactory level of photocatalytic activity in an efficient manner. The apparatus, which can continuously carry out the rapid heating immediately after the production of the substrate, can produce the functional material having photocatalytic activity in an efficient manner.

42 Claims, 4 Drawing Sheets

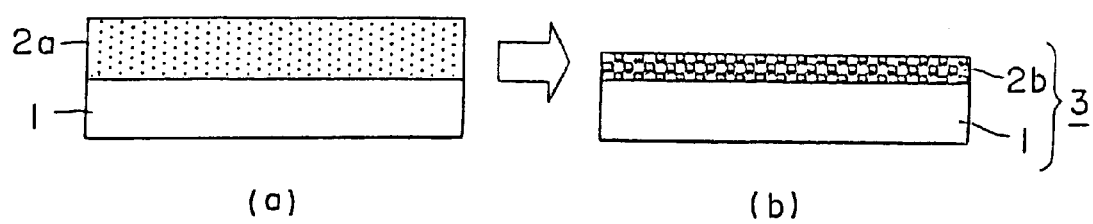
(a)  (b)
F I G. 1
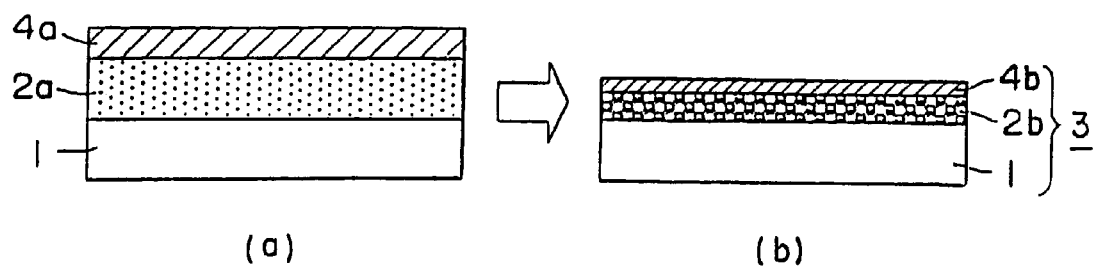
(a)  (b)
F I G. 2

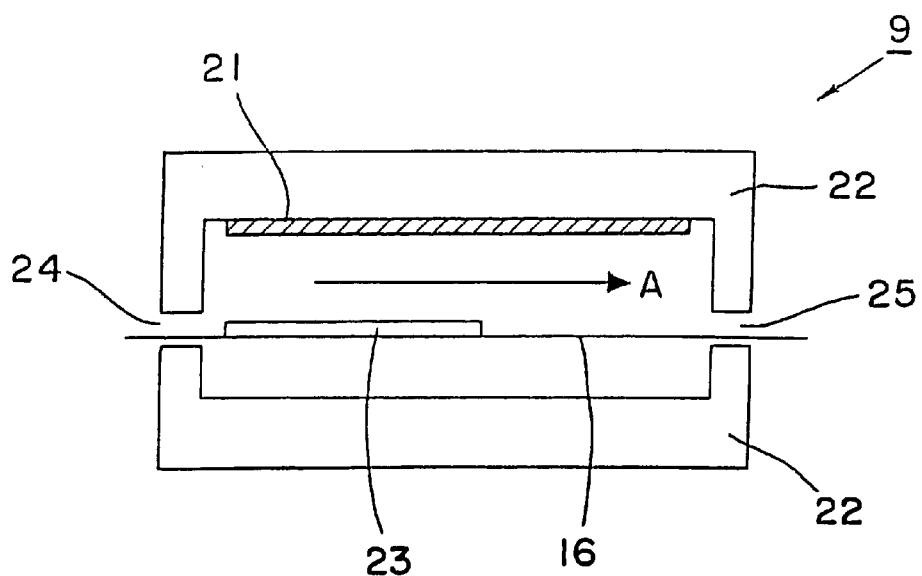
F I G. 4

METHOD AND APPARATUS FOR PRODUCING A PHOTOCATALYTIC MATERIAL

This application is a continuation of International application Ser. No. PCT/JP99/04126, which has the international filing date of Jul. 30, 1999, and which was not published under PCT Article 21(2) in English.

BACKGROUND OF THE INVENTION

1. Field of the Invention

The present invention relates to a process and an apparatus for producing a functional material having various types of excellent photocatalytic activity, such as antimicrobial (bactericidal) activity, deodorant activity, and antifouling activity, useful for waste water treatment, purification of harmful gases and the like.

2. Background Art

In recent years, environmental pollution, for example, water pollution created by domestic waste water, industrial waste water or the like, offensive odor, or contamination with bacteria, typified by MRSA, or mold in living spaces and working spaces has been increased and has become a social problem.

Photocatalysts have drawn attention as materials that, upon light irradiation, cause adsorption of oxygen molecules on bacteria, mold, and organic compounds, such as offensive odor components, or desorption of oxygen molecules therefrom and accelerate the decomposition (oxidation) of the organic compounds. A number of attempts have been made to fix a photocatalyst on the surface of a substrate to clean the surface of the substrate.

PCT/WO 96/29375 discloses that the surface of a photocatalyst-containing layer provided on the surface of a substrate exhibits high hydrophilicity (for example, a contact angle thereof with water of not more than 10 degrees) in response to photoexcitation of the photocatalyst. This property can be utilized to improve antifogging properties and ensuring of visibility of transparent members, such as glasses, lenses, and mirrors, to improve water cleanability and rainfall cleanability of the surface of articles and to improve other properties.

Functional materials utilizing the function of the photocatalyst have hitherto been produced by providing a coating liquid containing a photocatalytic metal oxide or a precursor of the photocatalytic metal oxide, coating the coating liquid, and drying or sintering the coating. For example, a titania sol prepared from a titanium alkoxide and an alcoholamine or a sol prepared by dispersing particles of $TiO_2$, $ZnO$, $SrTiO_3$ or the like in an aqueous solvent has been coated onto the surface of a substrate followed by drying or sintering. More specifically, as disclosed in Japanese Patent No. 2517874, the production process of functional materials comprises: coating a titania sol onto a substrate; heating the coated substrate in such a manner that the temperature is gradually raised from room temperature to a final temperature of 600 to 700° C. to perform firing, thereby fixing the photocatalyst onto the substrate.

SUMMARY OF THE INVENTION

The present inventors have now found that functional materials having satisfactory photocatalytic activity can be efficiently produced by rapid heating. They have further found that rapid heating immediately after, that is, successively from, the production of the substrate can realize the production of functional materials having photocatalytic activity in more efficient manner. The present invention has been made based on such finding.

Accordingly, it is an object of the present invention to provide a process and an apparatus for producing a functional material having a satisfactory level of photocatalytic activity.

According to one aspect of the present invention, there is provided a process for producing a functional material having photocatalytic activity, comprising the steps of: coating a photocatalyst coating composition comprising a photocatalytic metal oxide and/or a precursor of the photocatalytic metal oxide onto the surface of a substrate; and rapidly heating the surface of the coated substrate to fix the photocatalaytic metal oxide onto the surface of the substrate.

According to another aspect of the present invention, there is provided an apparatus for producing a functional material having photocatalytic activity, said apparatus comprising at least coating means for coating a photocatalyst coating composition comprising a photocatalytic metal oxide and/or a precursor of the photocatalytic metal oxide onto the surface of a substrate and heating means for rapidly heating the surface of the coated substrate to fix the photocatalytic metal oxide onto the surface of the substrate.

According to the process and apparatus of the present invention, a photocatalytic metal oxide can be surely fixed in a short time on the surface of a substrate, and, in addition, a functional material can be obtained which has high surface smoothness, possesses high photocatalytic activity, and high abrasion resistance and chemical resistance. Furthermore, the process and apparatus of the present invention can reduce the size of the production apparatus used and can realize simplification of the production process and space saving. Furthermore, shortening of the time taken for heating can advantageously contribute to a reduction in cost and a reduction in the amount of the exhaust gas emitted.

BRIEF DESCRIPTION OF THE DRAWINGS

FIGS. 1(a) and (b) are diagrams illustrating an embodiment of the process for producing a functional material having photocatalytic activity according to the present invention, wherein a layer 2a of a photocatalyst coating composition coated onto a substrate 1 is rapidly heated to form a thin layer 2b for imparting photocatalytic activity to the substrate 1;

FIGS. 2(a) and (b) are diagrams illustrating another embodiment of the process for producing a functional material having photocatalytic activity according to the present invention, wherein, upon rapid heating of a layer 2a of a photocatalyst coating composition and a layer 4a of a binder and a solvent coated on a substrate 1, the layer 2a is converted to a thin layer 2b for imparting photocatalytic activity to the substrate 1 while the layer 4a is converted to a layer 4b which has noncrosslinked oxygen and contributes to the development of hydrophilicity;

FIG. 4 is a schematic diagram showing the structure of the rapid heating device 9 shown in FIG. 3, wherein the rapid heating device 9 comprises a heating element 21, a heat-resistant material 22 which covers the heating element 21 and forms a heating space, carrying means 16 for holding the substrate 23, to be heated, within the heating space and carrying the substrate in a direction indicated by an arrow A in the drawing, a carry-in port 24 for carrying the substrate in the heating space, and a carry-out port 25 for carrying out the substrate from the heating space.

PREFERRED EMBODIMENTS OF THE INVENTION

Figure 3:
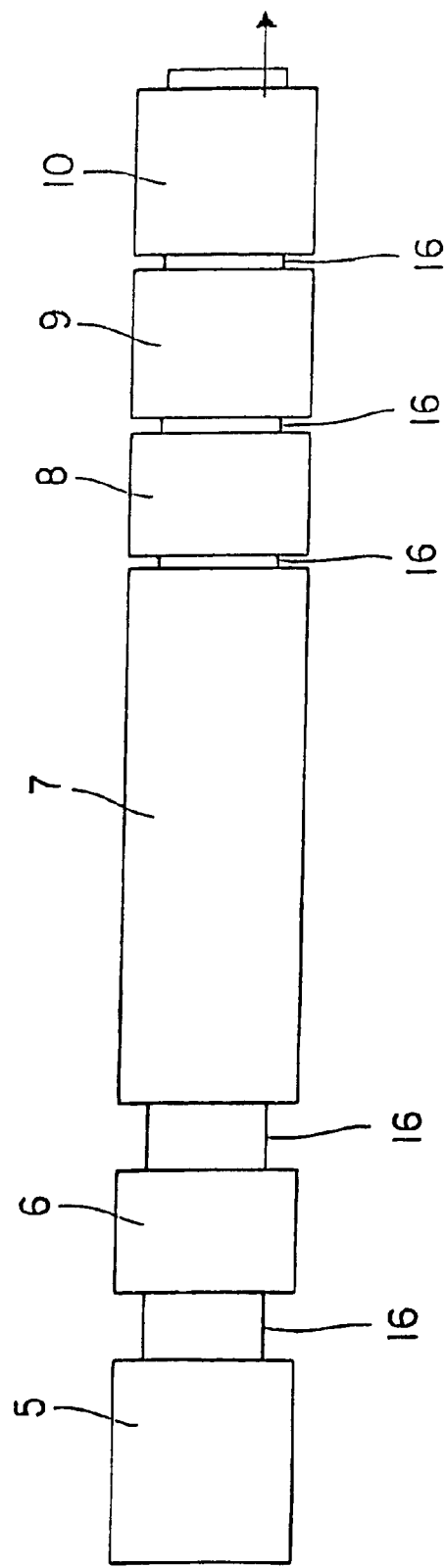
FIG. 3 is a diagram illustrating an embodiment of the apparatus for producing a functional material according to the present invention, which comprises: an apparatus for producing earthenware as a substrate, comprising a forming device 5, a glazing device 6, and a firing device 7; the apparatus of the present invention provided continuously from the apparatus for producing the substrate, the apparatus of the present invention comprising a coating device 8 for coating a photocatalyst coating composition, a rapid heating device 9, and a cooling device 10; and a carrying device 16 provided so that the substrate can be continuously carried through within each of the devices and through between the devices.

Prioress for Producing Functional Material (a) Substrate

The present invention relates to a process for producing a functional material having photocatalytic activity. By virtue of photocatalytic activity, various functions are imparted to substrates, and examples of such functions include hydrophilicity, antimicrobial activity, antifouling properties, antialgae properties, antifogging properties, conversion of NOx, and antistatic properties. Therefore, the "functional material" produced by the process according to the present invention refers to a material which, as a result that photocatalytic activity has been imparted, has come to possess at least one function among the above various functions. Substrates to which the production process of the present invention is applicable include metals, inorganic materials, organic materials, and composite of these materials. Specific examples thereof include interior materials, exterior materials, tiles, sanitary wares, tablewares, calcium silicate board, cement extruded boards and other building materials, ceramic boards, semiconductors and other new ceramics, insulators, glasses, mirrors, woods, and resins.

(b) Photocatalyst Coating Composition

According to the production process of the present invention, a photocatalyst coating composition to be coated onto the substrate is first provided. The photocatalyst coating composition comprises a photocatalytic metal oxide and/or a precursor of the photocatalytic metal oxide.

The term "photocatalytic metal oxide" used herein refers to a material which, upon exposure to light (excitation light) having higher energy (i.e., shorter wavelength) than the energy gap between the conduction band and the valence band of the crystal, can cause excitation (photoexcitation) of electrons in the valence band to produce conduction electrons and holes. The photocatalytic metal oxide decomposes an organic compound through a redox reaction, or come to have a very high level of hydrophilicity as a result of adsorption of water molecules in atmosphere. According to a preferred embodiment of the present invention, the photocatalytic metal oxide is selected from the group consisting of $TiO_2$, ZnO, $SnO_2$, $SrTiO_2$, $WO_3$, $Bi_2O_3$, $Fe_2O_3$, and $V_2O_5$.

According to the present invention, the photocatalyst coating composition may contain a precursor of the photocatalytic metal oxide. The term "precursor of the photocatalytic metal oxide" refers to a compound which can be converted to the photocatalytic metal oxide upon rapid heating described below. According to a preferred embodiment of the present invention, precursors of the photocatalytic metal oxide usable herein include compounds which contain at least one metal selected from the group consisting of titanium, zinc, tin, strontium, tungsten, bismuth, iron, and vanadium and, upon rapid heating described below, can be converted respectively to the corresponding photocatalytic metal oxides.

According to a preferred embodiment of the present invention, the photocatalyst coating composition further comprises a binder. The addition of the binder is advantageous in that the photocatalytic metal oxide can be more strongly fixed onto the surface of the substrate. A specific example of preferred binders usable herein is, as described below, a mixture of at least one member, selected from the group consisting of, inorganic oxide particles, silicone resin film precursors capable of forming silicone resin films, and silica film precursors capable of forming silica films, with a solvent. Another examples of preferred binders include alkali silicates represented by formula $Me_2O \cdot nSiO_2$ wherein Me represents an alkali metal, for example, water glass, potassium silicate, lithium silicate, sodium silicate, and silica. Further, mixtures of the above binders with silicon, aluminum, potassium, lithium, sodium, cesium, calcium, magnesium, titanium, phosphorus, boron, zirconium, lanthanides, such as cerium, or compounds of the above elements are possible. Compounds of silicon, aluminum, potassium, lithium, sodium, cesium, calcium, magnesium, titanium, phosphorus, boron, zirconium, and cerium refer to compounds represented by formula MO, MOH, MX, or MOR wherein M represents the above element, X represents a halogen atom, and R represents an alkyl group. Specific examples of the these compounds include $SiO_2$, $SiO_3$, $Si(OH)$, $Al(OH)_3$, $TiCl_4$, and $Ti(OC_3H_7)_4$. Utilization of these mixtures as the binder can provide functional materials having good photocatalytic activity. More specifically, functional materials can be provided which have a high level of retention of hydrophilicity in dark places, and permit oil stains to be easily removed by water. Further, functional materials having negative surface charges can be obtained. Furthermore, functional materials having a short half value period (preferably not more than 10 sec) of surface charges can be provided. Furthermore, by virtue of high surface strength (according to a preferred embodiment of the present invention, a hardness of not less than 2H in terms of pencil hardness), functional materials possessing excellent chemical and physical resistance can also be provided.

A precursor of the alkali silicate may be used in combination with or instead of the alkali silicate. Precursors of the alkali silicate include hydroxides of lithium, potassium, sodium, and silicon.

According to a preferred embodiment of the present invention, the concentration of the photocatalytic metal oxide and/or the precursor of the photocatalytic metal oxide in the photocatalyst coating composition is preferably 0.001 to 35% by weight on a solid basis, more preferably 0.1 to 10% by weight. When the concentration is in the above range, a photocatalytic surface having good properties and good strength can be provided. Further, in this case, it is possible to provide functional materials the surface of which is even and smooth and has good gloss.

Further, the photocatalyst coating composition can produce a large amount of non-crosslinked oxygen on the surface of the functional material which will be described later. The term "non-crosslinked oxygen" used herein refers to the following oxygen. In a large part of the binder component, M—OH, wherein M represents a metal element with specific examples thereof including silicon, titanium, aluminum, zirconium, tin, tantalum, and bismuth, is crosslinked upon rapid heating to form M—O—M bonds. This results in an increase in molecular weight, and the binder, together with the photocatalytic meal oxide, is fixed onto the surface of the substrate. In this case, a part of the M—OH is incorporated into the resultant polymer molecules and is present without forming the M—O—M bond. This part of the M—OH is ionically bonded to ion species (for example, sodium) present in the photocatalyst coating composition to give M—O$^-$X$^+$ (wherein X represents a cation, such as sodium ion) which can be reversibly converted to M—OH. Further, the present inventors have found that, under rapid heating conditions described below, the M—O—M bond, upon contact with water molecules in the air, is dissociated into M—OH bond. In the present invention, M—OH and M—O$^-$X$^+$ refer to noncrosslinked oxygen. The non-crosslinked oxygen has high affinity for water molecules and even functions to incorporate water molecules in the air into the substrate in its surface. Further, upon contact of the surface of the substrate with water, the non-crosslinked oxygen is likely to be bonded preferentially to water molecules rather to molecules which are present on the surface of the substrate before water is deposited thereon. This results in the replacement of molecules, which are present on the surface of the substrate before water is deposited thereon, with water molecules. Consequently, the molecules, which are present on the surface of the substrate before water is deposited thereon, are removed from the surface of the substrate. Thus, the presence of the non-crosslinked oxygen on the surface of the substrate contributes to the development of a very high level of hydrophilicity on the surface of the substrate through cooperation with the hydrophilicity created by the photocatalytic metal oxide. This very high level of hydrophilicity offers an advantage that not only hydrophilic stains or soils but also lipophilic stains or soils can be easily washed away with water.

According to a preferred embodiment of the present invention, the photocatalyst coating composition contains the binder in an amount of 0.001 to 100 parts by weight, more preferably 0.1 to 5 parts by weight, based on 1 part by weight of the photocatalytic metal oxide and the precursor of the photocatalytic metal oxide. When the amount of the binder and the amount of the photocatalytic metal oxide satisfy the above relationship, the temperature necessary for the rapid heating is not very high. Further, functional materials having good properties can be provided.

According to a preferred embodiment of the present invention, the photocatalyst coating composition may further comprise a metal and/or a metal oxide, for example, at least one member selected from the group consisting of copper, silver, nickel, iron, zinc, platinum, gold, rhodium, vanadium, chromium, cobalt, manganese, tungsten, niobium, antimony, platinum group metals, and oxides of the above metals. A preferred example of the metal and the metal oxide is at least one member selected from the group consisting of particles of copper, silver, platinum, cobalt, iron, nickel, $CU_2O$, $Ag_2O$, gold, zinc, chromium, manganese, and molybdenum. The addition of the metal or the metal oxide to the photocatalyst coating composition results in the formation of a film which can kill bacteria and mold deposited on the surface thereof even in a dark place.

Further, the addition of platinum metals, such as platinum, palladium, ruthenium, rhodium, iridium, and osmium, or oxides thereof is preferred because they can enhance redox activity of the photocatalyst and consequently can improve the decomposition of organic stains or soils and the decomposition of harmful gases or offensive odors. Another preferred example of the metal oxide is at least one member selected from the group consisting of oxides of silicon, aluminum, potassium, lithium, sodium, cesium, rubidium, and francium. The addition of these metal oxides can yield a film having improved hydrophilicity. In this case, the metal oxide may be added as having also functions of the binder.

According to a preferred embodiment of the present invention, the metal and the metal oxide are supported on the surface of the photocatalytic metal oxide. The metal and the metal oxide may be supported on the surface of the photocatalytic metal oxide, for example, by a method which comprises adding a metal salt, such as silver nitrate or copper acetate, to a sol of photocatalyst particles and irradiating the mixture with ultraviolet light or the like to previously photoreductively fix the metal onto the surface of the photocatalyst particles, a method which comprises fixing photocatalyst particles onto the surface of the substrate, coating a metal salt, such as silver nitrate or copper acetate, and irradiating the coating with ultraviolet light or the like, thereby supporting the metal onto the surface of the photocatalyst metal in a laterstage, or a method wherein the photocatalyst is doped with the metal.

According to a preferred embodiment of the present invention, the photocatalyst coating composition further comprises a surfactant. The addition of the surfactant permits the photocatalyst coating composition to be evenly coated onto the surface of the substrate.

According to the most preferred embodiment of the present invention, the photocatalyst coating composition basically comprises:

(1) a photocatalytic metal oxide;
(2) at least one member selected from the group consisting of inorganic oxide particles, silicone resin film precursors capable of forming silicone resin films, and silica film precursors capable of forming silica films; and
(3) a solvent.

The average crystallite diameter of the photocatalytic metal oxide is preferably not more than 100 nm. The upper limit of the average crystallite diameter is preferably about 20 nm, more preferably about 10 nm. The lower limit of the average crystallite diameter is preferably about 1 nm, more preferably about 3 nm. An average crystallite diameter of the photocatalytic particles in the above range enables the hydrophilification to be satisfactorily exhibited and, at the same time, makes it possible to prevent loss of transparency, of a surface with the composition applied thereto, derived from scattering of visible light caused by the particles.

Examples of inorganic oxide particles usable in the composition according to the present invention include: single oxides, such as silica, alumina, zirconia, ceria, yttria, boronia, magnesia, calcia, ferrite, amorphous titania, and hafnia; and composite oxides, such as barium titanate, calcium silicate, water glass, aluminosilicate, and calcium phosphate.

According to a preferred embodiment of the present invention, the inorganic oxide is preferably in the form of either an aqueous colloid using water as a dispersing medium or an organosol prepared by dispersing the inorganic oxide in a colloidal form in a hydrophilic solvent, such as ethyl alcohol, isopropyl alcohol, or ethylene glycol. In particular, use of colloidal silica is preferred.

The diameter of the inorganic oxide particle is not particularly limited. However, a particle diameter of about 5 to 50 nm in the form of an aqueous colloid or an organosol is preferred from the viewpoint of the gloss, turbidity, haze, transparency and the lice of the final photocatalytically hydrophilifiable coating.

A preferred example of the silicone coating precursor, capable of forming a silicone coating, which may be used in the composition of the present invention is a siloxane represented by the average composition formula:

$$R_pSiX_qO_{(4-p-q)/2}$$

wherein R represents a member selected from the group consisting of a hydrogen atom and one or more organic groups;

X represents an alkoxy group or a halogen atom; and p is a number satisfying 0<p<2 and q is a number satisfying 0<q<4.

Another preferred example of the silicone coating precursor, capable of forming a silicone coating, which may be used in the composition of the present invention is a hydrolyzable silane derivative represented by the general formula:

$$R_pSiX_{4-p}$$

wherein R is as defined above;

X represents an alkoxy group or a halogen atom; and p is 1 or 2.

In this case, the organic group represented by R refers to preferably an alkyl (more preferably an unsubstituted alkyl having 1 to 18 carbon atoms, most preferably an alkyl having 3 to 18 carbon atoms) or an aryl (preferably phenyl).

Specific examples of preferred hydrolyzable silane derivatives include methyltrimethoxysilane, methyltriethoxysilane, methyltripropoxysilane, methyltributoxysilane, ethyltrimethoxysilane, ethyltriethoxysilane, ethyltripropoxysilane, ethyltributoxysilane, phenyltrimethoxysilan, phenyltriethoxysilane, phenyltripropoxysilane, phenyltributoxysilane, dimethyldimethoxysilane, dimethyldiethoxysilane, dimethyldipropoxysilane, dimethyldibutoxysilane, diethyldimethoxysilane, diethyldiethoxysilane, diethyldipropoxysilane, diethyldibutoxysilane, phenylmethyldimethoxysilane, phenylmethyldiethoxysilane, phenylmethyldipropoxysilane, phenylmethyldibutoxysilane, n-propyltrimethoxysilane, n-propyltriethoxysilane, n-propyltripropoxysilane, n-propyltributoxysilane, γ-glycosidoxypropyltrimethoxysilane, and γ-acryloxypropyltrimethoxysilane.

The siloxane may be prepared by partial hydrolysis and dehydropolycondensation of the hydrolyzable silane derivative, or by dehydropolycondensation of a partial hydrolyzate of the hydrolyzable silane derivative with a partial hydrolyzate of tetramethoxysilane, tetraethoxysilane, tetrapropoxysilane, tetrabutoxysilane, diethoxydimethoxysilane or the lice.

The silicone resin prepared by partial hydrolysis or dehydropolycondensation of the above precursor according to the following method is represented by the following average composition formula:

$$R_pSiO_{(4-p)/2}$$

wherein R is as defined above;

X is an alkoxy group or a halogen atom; and p is a number satisfying 0<p<2.

The content of the precursor in the composition according to the present invention may be suitably determined. For example, in terms of the silica content based on one part by weight of the photocatalytic particle, the upper limit of the precursor content is preferably 10 parts by weight, more preferably 5 parts by weight, most preferably 1 part by weight, and the lower limit of the precursor content is preferably 0.05 part by weight, more preferably 0.1 part by weight, and most preferably 0.2 part by weight.

The solvent contained in the composition according to the present invention is not limited so far as it can stably disperse the photocatalytic particles and the precursor and a hydrophilified surface is finally provided. Examples of solvents usable herein include water, an organic solvent, and a mixed solvent composed of water and an organic solvent. Water, an alcohol, or a mixed solvent composed of water and an alcohol is particularly preferred.

According to a preferred embodiment of the present invention, use of an alcohol, which has a molecular weight of 60 to 300, preferably 60 to 100, and is liquid at room temperature, is preferred.

Specific examples of preferred alcohols usable herein include methanol, ethanol, n-propanol, isopropanol, t-butanol, isobutanol, n-butanol, 2-methylpropanol, pentanol, ethylene glycol, monoacetone alcohol, diacetone alcohol, ethylene glycol monomethyl ether, 4-hydroxy-4-methyl-2-pentanone, dipropylene glycol, propylene glycol, tripropylene glycol, I-ethoxy-2-propanol, 1-butoxy-2-propanol, 1-propoxy-2-propanol, propylene glycol monomethyl ether, dipropylene glycol monomethyl ether, dipropylene glycol monoethyl ether, tripropylene glycol monomethyl ether, and 2-butoxyethanol.

A preferred example of the silica coating precursor is a silicate represented by the average composition formula:

$$SiX_qO_{(4-q)/2}$$

wherein X represents an alkoxy group or a halogen atom and q is a number satisfying 0<q<4.

Another preferred example of the silica coating precursor is a tetrafunctional hydrolyzable silane derivative represented by the general formula:

$$SiX_4$$

wherein R is as defined above; and

X represents an alkoxy group or a halogen atom.

Specific examples of preferred tetrafunctional hydrolyzable silane derivatives usable herein include tetramethoxysilane, tetraethoxysilane, tetrapropoxysilane, tetrabutoxysilane, and diethoxydimethoxysilane.

Specific examples of preferred silicates usable herein include partial hydrolyzates and dehydropolycondensation products of the tetrafunctional hydrolyzable silane derivatives.

Water, an alcohol and the like may be used as the solvent for the composition. Particularly preferred are liquid alcohols having a molecular weight of 60 to 300. Since the evaporation rate of these alcohols is suitably slow, at the time of coating of the composition, a variation in dispersiblity of the composition due to the evaporation of the solvent can be inhibited, making it possible to form a transparent, even coating.

Examples of suitable liquid alcohols having a molecular weight of 60 to 300 usable herein include n-propanol, isopropanol, t-butanol, isobutanol, n-butanol, 2-methylpropanol, pentanol, ethylene glycol, monoacetone alcohol, diacetone alcohol, ethylene glycol monomethyl ether, 4-hydroxy-4-methyl-2-pentanone, dipropylene glycol, propylene glycol, tripropylene glycol, 1-ethoxy-2-propanol, 1-butoxy-2-propanol, 1-propoxy-2-propanol, propylene glycol monomethyl ether, dipropylene glycol monomethyl ether, dipropylene glycol monoethyl ether, and tripropylene glycol monomethyl ether.

The composition may comprise, in addition to the above components, a surfactant, a polymerization curing catalyst, a hydrolysis catalyst, a levelling agent, an antimicrobial metal, a pH adjustor, a perfume, a preservative and the like.

Polymerization catalysts usable herein include aluminum compounds, such as aluminum chelate, aluminum acetyl acetonate, aluminum perchlorate, aluminum chloride, aluminum isobutoxide, and aluminum isopropoxide; titanium compounds, such as tetraisopropyl titanate and tetrabutoxy titanate; basic compounds, such as sodium hydroxide, lithium hydroxide, potassium hydroxide, sodium methylate, sodium acetate, sodium formate, potassium acetate, potassium formate, potassium propionate, and tetramethyl ammonium hydroxide; amine compounds, such as n-hexylamine, tributylamine, diazabicycloundecene, ethylenediamine, hexanediamine, diethylenetriamine, tetraethylenepentamine, triethylenetetramine, ethanolamines, γ-aminopropyltrimethoxysilane, aminopropylmethyldimethoxysilane, γ-(2-aminomethyl)-aminopropyltrinethoxysilane, and γ-(2-aminomethyl)-aminopropylmethyldimethoxysilane; tin compounds, such as tin acetyl acetonate, and dibutyltin octylate; metal-containing compounds, such as cobalt octylate, cobalt acetyl acetonate, and iron acetyl acetonate; and acidic compounds, such as phosphoric acid, nitric acid, phthalic acid, p-toluenesulfonic acid, and trichloroacetic acid.

Suitable hydrolysis catalysts usable herein include nitric acid, hydrochloric acid, acetic acid, sulfuric acid, sulfonic acid, maleic acid, propionic acid, adipic acid, fumaric acid, phthalic acid, valeric acid, lactic acid, butyric acid, citric acid, malic acid, picric acid, formic acid, carbonic acid, and phenol, the above catalysts having a pH of 2 to 5.

Leveling agents usable herein include diacetone alcohol, ethylene glycol monomethyl ether, 4-hydroxy-4-methyl-2-pentanone, dipropylene glycol, tripropylene glycol, 1-ethoxy-2-propanol, 1-butoxy-2-propanol, propylene glycol monomethyl ether, 1-propoxy-2-propanol, dipropylene glycol monomethyl ether, dipropylene glycol monoethyl ether, and tripropylene glycol monoethyl ether.

(c) Coating of Photocatalyst Coating Composition onto Substrate

According to the process of the present invention, the photocatalyst coating composition is coated onto a substrate. Examples of suitable coating methods include spray coating, dip coating, flow coating, spin coating, roll coating, brush coating, and sponge coating. According to a preferred embodiment of the present invention, the photocatalyst coating composition is coated onto the substrate by spray coating.

According to a preferred embodiment of the present invention, the surface of the substrate is preheated before coating of the photocatalyst coating composition. The preheating of the substrate may be carried out by heating the surface of the substrate to 20 to 400° C. The preheating of the substrate is advantageous in that, upon coating of the photocatalyst coating composition onto the surface of the preheated substrate, the photocatalyst coating composition evenly spreads and yields an even coating.

According to a preferred embodiment of the present invention, the surface of the substrate coated with the photocatalyst coating composition may be dried before rapid heating. Rapid heating, which will be described later, applies a large heat value to the substrate. Presence of excess water or solvent component on the substrate leads to a fear of the smoothness of the surface of the substrate being lost as a result of rapid evaporation of water or the solvent component and the like due to a rapid temperature change. Therefore, in some cases, preferably, excess water or solvent component is previously removed by drying. The drying may be carried out by air blasting or heating.

FIG. 1(a) is a schematic diagram showing an assembly comprising a layer 2a of a photocatalyst coating composition coated onto a substrate 1. Upon rapid heating described below, the photocatalyst coating composition layer 2a is brought to a thin layer 2b which functions to impart photocatalytic activity to the substrate 1. Thus, a functional material 3 having photocatalytic activity is obtained (FIG. 1(b)).

According to a preferred embodiment of the present invention, the photocatalyst coating composition may be coated onto the surface of the substrate so as to form a stacked or multi-layered coating. Specifically, an identical photocatalyst coating composition may be coated on the surface of the substrate a plurality of times. Alternatively, a plurality of different photocatalyst coating compositions may be provided followed by successive coating of the plurality of different photocatalyst coating compositions onto the surface of the substrate. When an identical photocatalyst coating composition is coated a plurality of time, the "coating to form a stacked or multi-layered coating" refers to the so-called "multi-coating" or "recoating." In this case, an even coating can be realized.

According to another preferred embodiment of the present invention, a composition composed of a binder and a solvent and substantially free from the photocatalytic metal oxide and the precursor of the photocatalytic metal oxide is first coated followed by coating of a photocatalyst coating composition comprising the photocatalytic metal oxide and/or the precursor of the photocatalytic metal oxide or a photocatalyst coating composition comprising the photocatalytic metal oxide and/or the precursor of the photocatalytic metal oxide and the binder. When satisfactory development of non-crosslinked oxygen is contemplated, preferably, a photocatalyst coating composition is first coated followed by coating of a composition composed of a binder and a solvent to form a stacked or multi-layer coating structure. FIG. 2 is a schematic diagram showing a functional material according to this embodiment. A layer 2a of a photocatalyst coating composition is coated onto a substrate 1, and a layer 4a composed of a binder and a solvent is coated on the layer 2a (FIG. 2(a)). Upon rapid coating, the photocatalyst coating composition layer 2a is brought to a thin layer 2b which imparts photocatalytic activity to the substrate 1, while the layer 4a is brought to a layer 4b which has act non-crosslinked oxygen and contributes to the development of hydrophilic nature. Thus, a functional material 3 having a photocatalytic activity is obtained (FIG. 2(b)).

(d) Rapid Heating

The surface of the substrate coated with the photocatalyst coating composition is then subjected to rapid heating. As used herein, the term "rapid heating" means heating for such a period of time that, although heat is evenly spread to the photocatalyst coating composition on the substrate, the temperature of the whole substrate does not yet reach the temperature of the coating on the surface of the substrate. Therefore, preferably, the rapid heating is carried out by intensively applying heat only to the surface of the substrate.

According to a preferred embodiment of the present invention, the rapid heating is carried out by heating the surface of the substrate to 100 to 800° C., more preferably to 150 to 600° C. Further, as described above, the heating time is such that the temperature of the whole substrate does not yet reach the above temperature. More specifically, the rapid heating time is preferably about 2 to 60 sec, more preferably 5 to 30 sec. Rapidly heating the surface of the substrate to the above temperature can realize the production of a functional material having satisfactory photocatalytic activity with high efficiency. This is particularly because heating to the above temperature range results in the formation of non-crosslinked oxygen with high efficiency which is very advantageous from the viewpoint of the development of hydrophilicity. Further, since the whole substrate does not reach the high temperature, breaking or cracking due to heat shock during temperature rise can be effectively prevented. Further, at the time of cooling, similar phenomena can be effectively prevented.

According to a preferred embodiment of the present invention, the heating temperature is kept constant during rapid heating. According to a preferred embodiment of the present invention, the temperature of the atmosphere in which the substrate is placed during rapid heating is preferably 100 to 1000° C.

According to a preferred embodiment of the present invention, the rapid heating is carried out using heating means of which the heating value per unit area is not less than 120 $MJ/m^2 \cdot hr$, more preferably not less than 400 $J/m^2 \cdot hr$.

The rapidly heated substrate is then cooled to provide a final functional material. According to a preferred embodiment of the present invention, the cooling may be rapidly carried out.

Apparatus for Producing Functional Material

According to the present invention, an apparatus suitable for producing the functional material is provided.

FIG. 3 is an explanatory view of the apparatus for producing a functional material according to the present invention. In the apparatus shown in the drawing, the apparatus according to the present invention is provided continuously from an apparatus for producing a substrate. The apparatus for producing the so-called "earthenware" as the substrate comprises a forming device 5, a glazing device 6, and a firing device 7. The apparatus according to the present invention comprises a device 8 for coating a plotocatalyst coating composition, a rapid heating device 9, and a cooling device 10. The apparatus for producing a substrate is provided so as to continue to the apparatus according to the present invention. Further, a carrying device 16 is provided so that the substrate can be continuously carried through within each device and between devices. Therefore, the apparatus for producing a substrate, comprising a substrate forming device 5, a glazing device 6, and a firing device 7 may be properly selected and may have other construction according to the substrate to which the process of the present invention is to be applied. The apparatus according to the present invention is not limited to an apparatus comprising a coating device 8 for coating a photocatalyst coating composition, a rapid heating device 9, and a cooling device 10, and connotes an apparatus, as shown in FIG. 3, which can continuously produce a functional material having photocatalytic activity from the production of a substrate. That is, a construction, wherein an apparatus comprising a coating device 8 for coating a photocatalyst coating composition, a rapid heating device 9, and a cooling device 10 is disposed just behind (downstream of) the apparatus for producing a substrate, also falls within the scope of the present invention.

A substrate is formed in the forming device 5 shown in the drawing. The substrate is coated with a glaze by means of the glazing device 6, and then fired in the firing device 7. The substrate, which has been fired in the firing device 7, has still high temperature. According to a preferred embodiment of the present invention, the photocatalyst coating composition is coated onto the substrate when the substrate is still in the state of a certain high temperature.

The construction of the coating device 8 shown in the drawing may vary depending upon selected coating methods. For example, when spray coating is selected, the coating device comprises a device for spraying a photocatalyst coating composition.

FIG. 4 is a schematic diagram showing the structure of the rapid heating device 9 shown in FIG. 3. The rapid heating device 9 basically comprises a heating element 21, a heat-resistant material 22 provided so as to cover the heating element 21 and to form a heating space, carrying means 16 for holding a substrate 23, to be heated, within the heating space and carrying the substrate 23 in a direction indicated by an arrow A, a carry-in port 24 for carrying the substrate in the heating space, and a carry-out port 25 for carrying out the substrate from the heating space.

The heating element 21 is not particularly limited so far as it can rapidly heat the substrate. Heating elements usable herein include electrical heating elements and heating elements which burn a gas or other fuel to generate heat. As described above, preferably, the rapid heating is carried out using heating means of which the heating value per unit area is not less than 120 $MJ/m^2 \cdot hr$, more preferably not less than 400 $MJ/m^2 \cdot hr$. Therefore, preferably, the heating element can generate the above heating value. The distance of the surface of the substrate from the heating element may be properly determined so that a satisfactory heating value for rapid heating is applied to the substrate. The distance would be generally about 5 to 300 mm. Therefore, preferably, the heating element is provided so that the distance between the heating element and the substrate is fixed or variable in the above range.

As described above, preferably, the heating temperature is kept substantially constant during rapid heating. Therefore, preferably, the heating space of the rapid heating device is satisfactorily insulated by an insulating material 22 and undergoes no significant influence of heat loss form the carry-in port 24 and the carry-out port 25. The carry-in port 24 and the carry-out port 25 may be always in released state as shown in FIG. 4. Alternatively, the carry-in port 24 may be constructed so that the port 24 is usually closed while the port 24 is opened when the substrate is carried in the rapid heating device. Likewise, the carry-out port 25 may be constructed so that the port 25 is usually closed while the port 25 is opened when the substrate is carried out from the rapid heating device. The length of the region where the temperature for rapid heating is kept substantially constant may be properly determined. The length would be generally 5 cm to 30 m.

The construction of the carrying device 16 is not particularly limited so far as the device can hold the substrate within the heating space and carries through the heating space. The carrying device 16 is preferably a belt conveyor or a roller conveyor. According to a preferred embodiment of the present invention, in order to attain good thermal conduction within the heating space, the carrying device 16 is constructed so that the heating space is not excessively thermally partitioned. For example, the carrying means is preferably a belt conveyor of a heatresistant porous belt having a percentage surface opening of not less than 20% or a roller conveyor of a group of heat-resistant rollers. Further, according to a preferred embodiment of the present invention, the carrying means is a belt conveyor of a heat-resistant net having a mesh size up to 50 mm×40 mm or a roller conveyor of a group of continuous heat-resistant rollers having a pitch of 1 to 300 mm.

The surface of the rapidly heated substrate is cooled by the cooling device 10 to room temperature. In this device, the substrate is placed in an atmosphere of room temperature and the surface of it is cooled to room temperature. So far as the temperature of the surface of the substrate can be decreased to room temperature, this cooling device may be constructed so that the substrate simply comes into contact with air of room temperature to lower the temperature of the surface of the substrate. Alternatively the device may be constructed so that air of room temperature or air having a temperature slightly above or below room temperature is forcibly blown against the substrate to lower the temperature of the surface of the substrate. In this connection, it should be noted that rapid cooling has a fear of cracking or the like being created on the surface of the functional material. Therefore, preferably, the cooling is carried out at a highest possible rate with caution so as not to create cracking or other unfavorable phenomenon.

Figure 5:
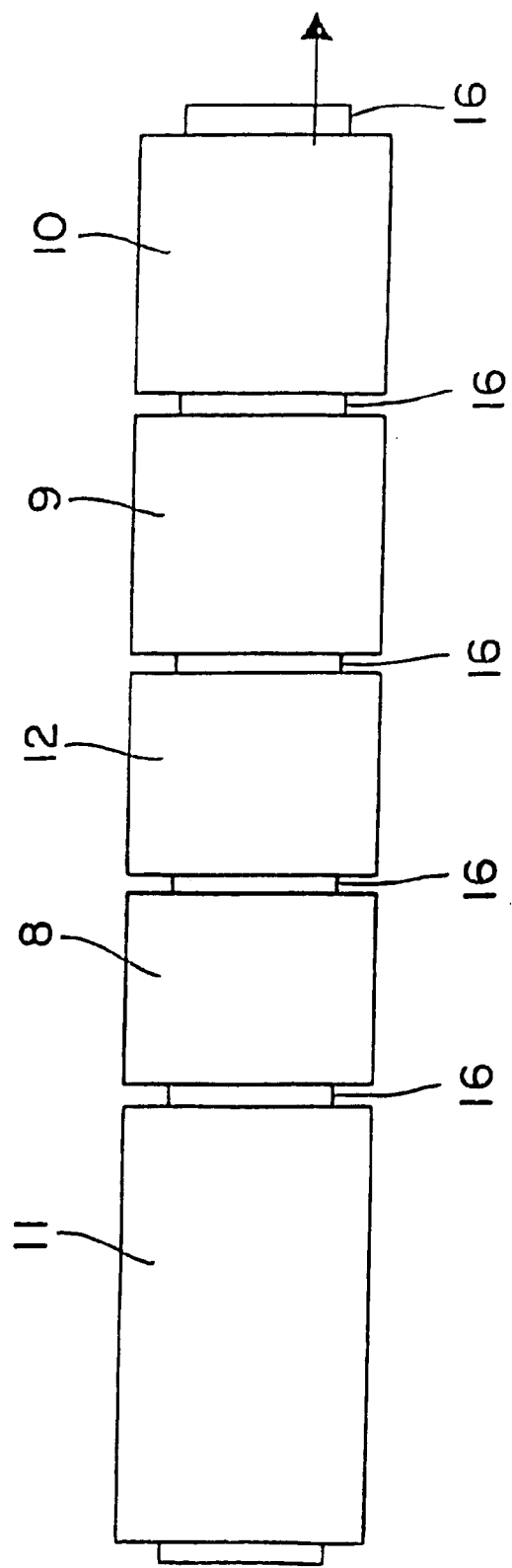
FIG. 5 is a diagram showing another embodiment of the apparatus according to the present invention, having the same construction as the apparatus shown in FIG. 3 except that a preheater 11 for preheating the surface of the substrate before coating a photocatalyst coating composition and a drier 12 for drying the substrate coated with the coating composition are additionally provided.

FIG. 5 shows an apparatus provided with a preheating device for preheating the surface of the substrate before coating of the photocatalyst coating composition. The preheating device can heat the surface of the substrate and raise the temperature of the surface of the substrate to a temperature high enough for evenly coating the photocatalyst coating composition. In the apparatus shown in FIG. 5, a preheating device 11 is provided before the coating device 8. As described above, preferably, the surface of the substrate is heated by this preheating device to a temperature of 20 to 400° C. It is a matter of course that an apparatus, shown in FIG. 3, comprising a substrate molding device 5, a glazing device 6, and a firing device 7 may be connected upstream of the preheating device 11. In this connection, however, since the substrate heated in the firing device 7 still has high temperature, when the functional material having photocatalytic activity is produced continuously from the production of a substrate, the provision of this preheating device is generally unnecessary. Therefore, the preheating device would be generally necessary when the substrate has been separately produced and hence does not have satisfactory temperature.

Further, in the apparatus shown in FIG. 5, a drying device 12 for drying the substrate coated with the photocatalyst coating composition by means of the coating device 8 is provided before the rapid heating device 9. This drying device 12 comprises air blowing means or heating means to remove excess water or solvent component from the surface of the substrate. In the apparatus shown in FIG. 5, the rapid heating device 9 and the cooling device 10 may be identical respectively to those shown in FIG. 3.

EXAMPLE

EXAMPLE 1

(a) Preparation of Photocatalyst Coating Composition

At the outset, a titanium sol (tradename: STS-21, manufactured by Ishihara Sangyo Kaisha Ltd.), a silica sol (tradename: Snowtex S, manufactured by Nissan Chemical Industry Ltd.), and lithium silicate (tradename: Lithium Silicate 35, manufactured by The Nippon Chemical Industrial Co., Ltd.) were mixed together. A 1% aqueous silver nitrate solution in an amount of 1 part by weight based on 1 part by weight of titanium oxide and a 0.3% aqueous copper acetate solution in an amount of 2 parts by weight based on 1 part by weight of titanium oxide were added to the mixture, followed by irradiation with ultraviolet light (intensity of ultraviolet light about 1 mW/cm$^2$) for 4 hr, during which time the solution was stirred so as to satisfactorily irradiate the solution with ultraviolet light. Thus, a mixed sol as a photocatalyst coating composition was prepared which was composed of: a titanium sol with silver and copper being supported on a titanium oxide photocatalsyt; a silica sol; and a lithium silicate. The final concentration in the mixed sol was 0.2% by weight for the titanium sol (solid content 0.1%), 0.3% by weight for the silica sol, and 0.4% by weight for lithium silicate.

(b) Preparation of Substrate

In an apparatus shown in FIG. 3, a starting material for ceramic ware was pressed in a forming device 5 to prepare a body. A glaze was coated onto the surface of the body in a glazing device 6. The coated body was passed through a roller hearth kiln as a firing device 7 kept at a firing temperature of 1150° C. over a period of 40 min to perform firing. Thus, a tile was obtained.

(c) Production of Functional Material

In an apparatus shown in FIG. 3, when the temperature of the tile became 150° C. at the outlet of the roller hearth kiln, the photocatalyst coating composition prepared above was spray coated by means of a coating device 8 onto the surface of the tile. The coverage of the photocatalyst coating composition was 15 g/m$^2$. Since the temperature of the tile was as high as 150° C., excess water was instantaneously evaporated. As a result, only solid matter was evenly stacked on the surface of the tile to form an about 0.1 μm-thick thin layer.

The tile was then carried in a furnace as a rapid heating device provided continuously from the coating device 8. The furnace had heating elements densely arrayed on the upper part of the interior thereof. The temperature of the atmosphere in the furnace was about 800 to 1000° C., the heating value per unit area within the furnace was about 1600 MJ/m$^2$·hr, and the heating area was 30 cm×150 cm. The time of residence of the tile within the furnace was about 30 sec, and the time for which the tile had been placed under the heating elements was about 10 sec. The rapid heating permitted the thin layer formed on the surface of the tile to be completely fixed onto the surface of the tile.

The surface of the tile carried out from the furnace had a temperature increased to 300 to 350° C. Subsequently, the tile was introduced into a cooling device where the tile was sprayed with cold air blown from above and below the tile. The tile was cooled to 100–150° C. during the period of time for which the tile was traveled by 3 m through the cooling device.

The tile as a functional material thus obtained had photocatalytic activity and high decomposition activities, such as antimicrobial activity, antifouling activity, and deodorant activity, and further was hydrophilic. The thin layer formed on the surface of the tile was a strong layer which had a strength (hardness) of not less than 4 in terms of Mohs hardness and possessed excellent abrasion resistance and chemical resistance.

The heat of wetting of the thin layer by water was determined and found to be as high as 500 erg/cm$^2$, suggesting that the thin layer had satisfactory hydrophilicity. The heat of wetting is regarded as a measure of wettability by a solvent and higher heat of wetting means that the wettability by the solvent is high.

EXAMPLE 2

(a) Preparation of Photocatalyst Coating Composition

A photocatalyst coating composition was prepared in the same manner as in Example 1, except that 1 part by weight of a 3% aqueous copper acetate solution was used instead of 1 part by weight of the 1% aqueous silver nitrate solution and 2 parts by weight of the 0.3% aqueous copper acetate solution.

(b) Preparation of Substrate

A large tile (0.9 m×1.8 m) was prepared in the same manner as in Example 1. Specifically, a starting material for ceramic ware was extruded by means of a forming device 5 in the apparatus shown in FIG. 3 to prepare a body. A glaze was coated onto the surface of the body by means of a glazing device 6. The coated body was passed through a roller hearth kiln as a firing device 7 kept at a firing temperature of 1150° C. over a period of 3 hr to perform sintering. Thus, a large tile was obtained.

(c) Production of functional material

In an apparatus shown in FIG. 3, when the temperature of the tile became 80° C., the photocatalyst coating composition as used in Example 1 was spray coated onto the surface of the tile by means of a coating device 8. The coverage of the photocatalyst coating composition was 15 g/m$^2$. Since the temperature of the tile was as high as 80° C., excess water was instantaneously evaporated. As a result, only solid matter was evenly stacked on the surface of the tile to form an about 0.1 μm-thick thin layer.

The tile was then carried in a furnace as a rapid heating device continuously provided from the coating device 8. The furnace had heating elements densely arrayed on the upper part of the interior thereof. The temperature of the atmosphere in the furnace was about 800 to 1000° C., the heating value per unit area within the furnace was about 1600 MJ/m$^2$·hr, and the heating area was 1.5 in×28 m. The time of residence of the tile within the furnace was about 60 sec, and the time for which the tile had been placed under the heating elements was about 50 sec. The rapid heating permitted the thin layer formed on the substrate to be completely fixed onto the surface of the tile.

The surface of the tile carried out from the furnace had a temperature increased to 200 to 250° C. Subsequently, the tile was introduced into a cooling device where the tile was sprayed with water. In the cooling device, the tile was cooled to 100–150° C. during the period of time for which the tile was traveled by 10 m through the cooling device.

The tile as a functional material thus obtained had photocatalytic activity and high decomposition activities, such as antimicrobial activity, antifouling activity, and deodorant activity, and further was hydrophilic. The thin layer formed on the surface of the tile was a strong layer which had a strength (hardness) of not less than 4 in terms of Mohs hardness and possessed excellent abrasion resistance and chemical resistance.

EXAMPLE 3

(a) Preparation of Photocatalyst Coating Composition

A titanium alkoxide (titanium tetraisopropoxide) and tetraethyl orthosilicate were diluted with isopropyl alcohol to prepare a photocatalyst coating composition having a titanium alkoxide concentration of 5% by weight and a tetraethyl orthosilicate concentration of 1% by weight.

(b) Substrate

A glass plate having a size of 1 m×1 m was provided as a substrate.

(c) Production of Functional Material

A functional material was produced using the same apparatus as shown in FIG. 5, except that, instead of provision of a pair of the coating device 8 and the drying device 12, the coating device 8 and the drying device 12 were alternately provided in three pairs. At the outset, the glass plate was heated to a surface temperature of 40° C. in a preheating device 11 kept at a temperature of 40° C. The photocatalyst coating composition was spray coated on the surface of the glass plate. The coverage was 5 g/m$^2$. Since the temperature of the glass substrate is as low as 40° C., the water and the alcohol are less likely to be evaporated. for this reason, after coating of the photocatalyst coating composition, the coating was dried at 100° C. The coating followed by drying was repeated three times. This permitted only solid matter to be evenly stacked on the surface of the glass plate to form an about 0.1 μm-thick thin layer.

Next, the glass plate with a thin layer formed thereon was carried in a furnace as a rapid heating device 9 provided continuously from the last drying device 12. The furnace had heating elements densely arrayed on the upper part of the interior thereof. The temperature of the atmosphere in the furnace was about 550° C. The time of residence of the glass plate within the furnace was about 2 sec. The rapid heating permitted the thin layer formed on the glass substrate to be completely fixed onto the surface of the glass plate.

The surface of the glass plate carried out from the furnace had a temperature increased to 250 to 350° C. Subsequently, the glass plate with a thin layer fixed thereon was introduced into a cooling device where air was blown against the glass plate. In the cooling device, the glass plate was cooled to 50–150° C. during the period of time for which the glass plate was traveled by 3 m through the cooling device.

The functional material thus obtained had high surface smoothness, photocatalytic activity, high degradation activity, and high hydrophilicity.

The thin layer formed on the surface of the glass plate was a strong layer which had a strength (Mohs hardness) of not less than 4 and possessed excellent abrasion resistance and chemical resistance.

EXAMPLE 4

(a) Preparation of Photocatalyst Coating Composition

The same photocatalyst coating composition as used in Example 1 was provided.

(b) Substrate

An inorganic decorative plate having thereon an acrylated urethane coating and, further, a fluororesin coating was provided as a substrate.

(c) Production of Functional Material

A functional material was produced using an apparatus shown in FIG. 5. The surface of the substrate was heated to 60° C. in the preheating device 11 set at a temperature of 60° C. The photocatalyst coating composition was spray coated on the surface of the substrate. The coverage was 20 g/m$^2$.

The coated substrate was then carried in a rapid heating device 9 provided continuously from the drying device 12. The rapid heating device 9 was a roller hearth kiln (RHK) (the temperature of the atmosphere 250° C.). The substrate with a coating formed thereon was passed through RHK over a period of about 45 sec to perform rapid heating. The rapid heating permitted the photocatalyst coating composition to be completely fixed onto the surface of the inorganic decorative plate as the substrate.

The functional material having photocatalytic activity thus obtained had high surface smoothness, decomposition activity and oil repellency. The thin layer formed on the substrate was a strong layer possessing excellent abrasion resistance and chemical resistance.

EXAMPLE 5

(a) Preparation of Photocatalyst Coating Composition

At the outset, a titanium sol (STS-21), a silica sol (tradename: Snowtex O, manufactured by Nissan Chemical Industry Ltd.), lithium silicate (tradename: Lithium Silicate 35, manufactured by Nissan Chemical Industry Ltd.), and a surfactant (Kao Emulgen 707) were mixed together. A 1% aqueous silver nitrate solution in an amount of 1 part by weight based on 1 part by weight of titanium oxide and a 0.3% aqueous copper acetate solution in an amount of 2 parts by weight based on 1 part by weight of titanium oxide were added to the mixture, followed by irradiation with ultraviolet light (intensity of ultraviolet light about 1 mW/cm$^2$) for 4 hr, during which time the solution was stirred so as to satisfactorily irradiate the solution with ultraviolet light. Thus, a mixed sol as a photocatalyst coating composition was prepared which was composed of: a titanium sol with silver and copper being supported on a titanium oxide photocatalyst; a silica sol; lithium silicate; and a surfactant. The final concentration in the mixed sol was 0.1% by weight for the titanium sol, 0.1% by weight for the silica sol, 0.5% by weight for lithium silicate, and 0.001% by weight for the surfactant.

(b) Substrate

Western tableware was provided as a substrate.

(c) Production of Functional Material

A functional material was produced using an apparatus shown in FIG. 5. At the outset, the tableware was heated to a surface temperature of 100° C. in a preheating device 11 set at a temperature of 100° C. The photocatalyst coating composition was spray coated on the surface of the tableware. The coverage was 40 g/m$^2$. Since the temperature of the tableware was as high as 100° C., water was instantaneously evaporated. As a result, only solid matter was evenly stacked on the surface of the tableware to form an about 0.4 µm-thick thin layer.

The tableware with a thin layer formed thereon was then carried in a furnace as a rapid heating device 9 continuously provided from the drying device 12. The furnace had heating elements densely arrayed on the upper part of the interior thereof. The temperature of the atmosphere in the furnace was about 800 to 1000° C., the heating value per unit area within the furnace was about 1600 MJ/m$^2$·hr, and the heating area was 30 cm×150 cm. The time of residence of the tableware within the furnace was about 10 sec. The rapid heating permitted the thin layer formed on the surface of the tableware to be completely fixed onto the surface of the tableware.

The surface of the tableware carried out from the furnace had a temperature increased to 250 to 300° C. Subsequently, the tableware was introduced into a cooling device where the tableware was subjected to air blast cooling. The tableware was cooled to 50–150° C. during the period of time for which the tableware was traveled by 3 m through the cooling device.

The tableware with a thin layer formed thereon thus obtained as a functional material had photocatalytic activity and excellent antimicrobial activity. A salad oil was deposited on the functional material and then washed in water. As a result, the salad oil deposited on the surface thereof could be easily removed by washing in water alone.

The thin layer formed on the surface of the tableware was a strong layer which had a strength (hardness) of not less than 4 in terms of Mohs hardness and possessed excellent abrasion resistance and chemical resistance.

EXAMPLE 6

A functional material was produced using an apparatus shown in FIG. 5. At the outset, a tile was heated to a surface temperature of 100° C. in a preheating device 11 set at a temperature of 100° C. A titanium chelate (0.05%) as a photocatalyst coating composition was then spray coated on the surface of the tile as the substrate. Water was immediately evaporated, and solid matter was fixed onto the surface of the tile to form an about 0.2 µm-thick thin layer.

The tile with a thin layer formed thereon was then carried in a furnace as a rapid heating device continuously provided from the drying device 12. The furnace had heating elements densely arrayed on the upper part of the interior thereof. The temperature of the atmosphere in the furnace was about 800 to 1000° C., the heating value per unit area within the furnace was about 1600 MJ/m$^2$·hr, and the heating area was 30 cm×150 cm. The time of residence of the tile within the furnace was about 10 sec. The rapid heating permitted the thin layer formed on the tile to be completely fixed onto the surface of the tile.

The surface of the tile carried out from the furnace had a temperature increased to 250 to 300° C. Subsequently, the tile was introduced into a cooling device where the tile was subjected to air blast cooling. The tile was cooled to 50–150° C. during the period of time for which the tile was traveled by 3 m through the cooling device.

The tile with a thin layer formed thereon thus obtained as a functional material had photocatalytic activity and excellent hydrophilicity and antimicrobial activity.

The thin layer formed on the surface of the tile was a strong layer which had a strength (hardness) of not less than 4 in terms of Mohs hardness and possessed excellent abrasion resistance and chemical resistance.

EXAMPLE 7

A functional material was produced using an apparatus shown in FIG. 5. A tile was heated to a surface temperature of 100 to 300° C. in a preheating device. A water-soluble coating liquid prepared by mixing a predetermined amount of a titanium oxide sol, a predetermined amount of an alkali silicate, and a predetermined amount of an alumina sol together and adjusting the mixture to a TiO$_2$ concentration of 0.2%, an SiO$_2$ concentration of 0.1%, an Li$_2$O concentration of 0.008%, an Na$_2$O concentration of 0.012%, a B$_2$O$_3$ concentration of 0.0015%, and an Al$_2$O$_3$ concentration of 0.005% was spray coated at a coverage of 2 to 3 µg per cm$^2$ of the tile surface. Water was immediately evaporated, and solid matter was fixed onto the surface of the tile. Next, the tile with solid matter fixed thereon was fired in the rapid heating device 9 provided continuously from the drying device 12 under conditions of in-furnace temperature about 850° C., heating value 1200 MJ/m$^2$·hr, and heating area 0.6 m$^2$. In this case, the highest temperature of the surface of the tile was 480° C. The time of residence of the tile within the furnace was about 15 sec As a result, a thin layer was formed on the surface of the tile. The photocatalytic activity of the functional material sample thus obtained was determined as follows. A 1% silver nitrate solution was coated onto the surface of the sample. The coated sample was allowed to stand under a BLB lamp for 5 min. The color difference (ΔE) was hen measured and found to be about 18. Further, the sample was allowed to stand under a BLB lamp for 24 hr. The contact angle of the sample with water was then measured and found to be about 5 degrees.

EXAMPLE 8

A functional material was produced using an apparatus shown in FIG. 5. A tile was heated to a surface temperature of 200° C. in a preheating device 11. An aqueous solution prepared by mixing a copper-doped titanium oxide sol and an alkali silicate together and adjusting the mixture to a $TiO_2$ concentration of 0.08%, a CuO concentration of 0.004%, an $SiO_2$ concentration of 0.3%, an $Li_2O$ concentration of 0.025%, an $Na_2O$ concentration of 0.04%, and a $B_2O_3$ concentration of 0.005% was spray coated at a coverage of 2 to 3 µg per cm² of the substrate surface. Water was immediately evaporated, and solid matter was fixed onto the surface of the tile. Next, the tile with solid matter fixed thereon was fired in the rapid heating device 9 provided continuously from the drying device 12 under conditions of in-furnace temperature about 750° C., heating value 1200 MJ/m²·hr, and heating area 0.6 m². In this case, the highest temperature of the surface of the tile as the substrate during firing was 350° C. The time of residence of the tile within the furnace was about 10 sec. As a result, a thin layer was formed on the surface of the tile. The photocatalytic activity of the functional material sample thus obtained was determined as follows. A 1% silver nitrate solution was coated onto the surface of the sample. The coated sample was allowed to stand under a BLB lamp for 5 min. The color difference (ΔE) was then measured and found to be about 18. Further, the surface of the sample had high antimicrobial activity.

What is claimed is:

1. A process for producing a functional material having photocatalytic activity, comprising the steps of: coating a photocatalyst coating composition comprising a photocatalytic metal oxide and/or a precursor of the photocatalytic metal oxide onto the surface of a substrate; and rapidly heating the surface of the coated substrate to fix the photocatalytic metal oxide onto the surface of the substrate, characterized in that:

the rapid heating is carried out by a heating means provided with a heating element having a heating value per unit area of not less than 120 MJ/m²hr, and the distance between the heating element and the surface of the substrate is 5 to 300 mm, and the rapid heating is carried out for 2 to 60 seconds.

2. The process according to claim 1, wherein the rapid heating is carried out by heating the surface of the substrate to 100 to 800° C.

3. The process according to claim 2, wherein the rapid heating is carried out by heating the surface of the substrate to 150 to 600° C.

4. The process according to claim 3, wherein, during the rapid heating, the substrate is placed in an atmosphere of 100 to 1000° C.

5. The process according to claim 1, wherein during the rapid heating, the heating temperature is kept substantially constant.

6. The process according to claim 1, wherein the surface of the substrate is preheated before coating of the photocatalyst coating composition.

7. The process according to claim 6, wherein the preheating is carried out by heating the surface of the substrate to 20 to 400° C.

8. The process according to claim 1, wherein the rapid heating is carried out by intensively supplying heat energy only to the surface of the substrate.

9. The process according to claim 1, wherein the substrate coated with the photocatalyst coating composition is dried before the rapid heating.

10. The process according to claim 1, wherein the surface of the rapidly heated substrate is then rapidly cooled.

11. The process according to claim 1, wherein the photocatalytic metal oxide is selected from the group consisting of $TiO_2$, ZnO, $SnO_2$, $SrTiO_2$, $WO_3$, $Bi_2O_3$, $Fe_2O_3$, and $V_2O_5$.

12. The process according to claim 1, wherein the precursor of the photocatalytic metal oxide is a compound which contains at least one metal selected from the group consisting of titanium, zinc, tin, strontium, tungsten, bismuth, iron, and vanadium and, upon the rapid heating, is converted to the photocatalytic metal oxide.

13. The process according to claim 1, wherein the photocatalyst coating composition further comprises a binder.

14. The process according to claim 13, wherein the binder comprises: at least one member selected from the group consisting of inorganic oxide particles, silicone resin film precursors capable of forming silicone resin films, and silica film precursors capable of forming silica films; and a solvent.

15. The process according to claim 13, wherein the binder comprises:

a member selected from the group consisting of silicon, aluminum, potassium, lithium, sodium, cesium, calcium, magnesium, titanium, phosphorus, boron, zirconium, rubidium, francium, yttrium, hafnium, lanthanides, and compounds of said elements; and an alkali silicate represented by formula $Me_2O\ nSiO_2$ wherein Me represents an alkali metal.

16. The process according to claim 1, wherein an identical photocatalyst coating composition is coated a plurality of times on the surface of the substrate to form a stacked or multi-layered coating, or alternatively, a plurality of different photocatalyst coating compositions are provided followed by successive coating of the plurality of photocatalytic coating compositions onto the surface of the substrate to form a stacked or multi-layered coating.

17. The process according to claim 1, which comprises the steps of: providing at least one coating composition comprising a binder and substantially free from the photocatalytic metal oxide and the precursor of the photocatalytic metal oxide and a photocatalyst coating composition comprising the photocatalytic metal oxide and/or the precursor of the photocatalytic metal oxide or a photocatalyst coating composition comprising the photocatalytic metal oxide and/or the precursor of the photocatalytic metal oxide and the binder;

coating them onto the surface of the substrate to form a multi-layered coating; and then rapidly heating the assembly.

18. The process according to claim 1, wherein the photocatalyst coating composition further comprises a metal and/or a metal oxide selected from silver, copper, zinc, metals of the platinum group, and oxides of said metals.

19. The process according to claim 18, wherein the metal and the metal oxide are present, in a supported state, on the surface of the photocatalytic metal oxide.

20. The process according to claim 19, wherein the metal and the metal oxide have been supported on the surface of the photocatalytic metal oxide by photoreduction fixation using ultraviolet light irradiation.

21. The process according to claim 1, wherein the concentration of the photocatalytic metal oxide and/or the precursor of the photocatalytic metal oxide in the photocatalyst coating composition is 0.001 to 35% by weight on a solid basis.

22. The process according to claim 1, wherein the photocatalyst coating composition contains a binder in an amount of 0.001 to 100 parts by weight based on one part by weight of the photocatalytic metal oxide and the precursor of the photocatalyst metal oxide.

23. The process according to claim 22, wherein the photocatalyst coating composition contains the binder in an amount of 0.1 to 5 parts by weight based on one part by weight of the photocatalytic metal oxide and the precursor of the photocatalytic metal oxide.

24. The process according to claim 1, wherein the substrate is made of a metal, an inorganic material, an organic material, or a composite material thereof.

25. The process according to claim 1, wherein the functional material having photocatalytic activity is an interior or exterior material.

26. The process according to claim 1, wherein the functional material having photocatalytic activity is a tile, a sanitary ware, a table ware, a calcium silicate board, a building material, a ceramic substrate, a semiconductor material, an insulator, a glass, or a mirror.

27. An apparatus for producing a functional material having photocatalytic activity, said apparatus comprising
at least a rapid heating means for rapidly heating the surface of a substrate coated with a photocatalyst coating composition comprising a photocatalytic metal oxide and/or a precursor of the photocatalytic metal oxide to fix the photocatalytic metal oxide onto the surface of the substrate, characterized in that:
the rapid heating means comprises at least:
a heating element of which the heating value per unit area is not less than 120 $MJ/m^2hr$ and which is provided so that the distance between the heating element and the surface of the substrate is 5 to 300 mm with the distance being fixed or variable;
a heat-resistant material which covers the heating element while forming a given heating space;
a holding means for holding the substrate within the heating space for 2 to 60 seconds;
a carry-in port for carrying the substrate into the heating space; and
a carry-out port for carrying out the substrate from the heating space.

28. The apparatus according to claim 27, which carries out the method according to claim 1.

29. The apparatus according to claim 27 wherein the heating means can maintain the heating temperature at a substantially constant value.

30. The apparatus according to claim 27, wherein the heating means maintains the heating temperature at a substantially constant value over a zone length of 5 cm to 30 m.

31. The apparatus according to claim 27, which further comprises preheating means for preheating the surface of the substrate before coating the photocatalyst coating composition.

32. The apparatus according to claim 27, which further comprises drying means for drying the substrate coated with the photocatalyst coating composition.

33. The apparatus according to claim 27, which further comprises cooling means for rapidly cooling the surface of the substrate heated by the heating means.

34. The apparatus according to claim 27, which comprises carrying means for continuously moving and carrying the substrate within the apparatus.

35. The apparatus according to claim 27, wherein the heating means is disposed immediately downstream of the coating means.

36. The apparatus according to claim 27, which is disposed immediately downstream of an apparatus for producing the substrate.

37. The apparatus according to claim 34, wherein the carrying means is a belt conveyor or a roller conveyor.

38. The apparatus according to claim 37, wherein the carrying means is a belt conveyor of a heat-resistant belt having a percentage surface opening of not less than 20% or a roller conveyor of a group of rollers.

39. The apparatus according to claim 37, wherein the belt conveyor comprises a heat-resistant net having a mesh size up to 50 mm×50 mm.

40. The apparatus according to claim 37, wherein the roller conveyor comprises continuous heat-resistant rollers having a pitch of 1 to 300 mm.

41. A functional material having photocatalytic activity, produced by the method according to claim 1 or the apparatus according to claim 27.

42. The apparatus according to claim 27, which further comprises a coating means for coating said photocatalyst coating composition onto the surface of the substrate.

* * * * *

UNITED STATES PATENT AND TRADEMARK OFFICE
CERTIFICATE OF CORRECTION

PATENT NO.    : 6,368,668 B1
DATED         : April 9, 2002
INVENTOR(S)   : Kobayashi et al.

It is certified that error appears in the above-identified patent and that said Letters Patent is hereby corrected as shown below:

Column 2,
Line 15, after "the" replace "photocatalaytic" with -- photocatalytic --

Column 3,
Line 27, replace "Prioress" with -- Process --

Column 5,
Line 63, after "iron, nickel," replace "$CU_2O$" with -- $Cu_2O$ --

Column 10,
Line 52, after "which has" delete "act"

Column 18,
Line 59, after "was" replace "hen" with -- then --

Column 20,
Line 56, after "according to claim" replace "1" with -- 20 --

Signed and Sealed this

Tenth Day of June, 2003

JAMES E. ROGAN
*Director of the United States Patent and Trademark Office*